(12) United States Patent
Ramisetty et al.

(10) Patent No.: US 11,337,075 B2
(45) Date of Patent: May 17, 2022

(54) PROVIDING MULTIPLE SERVER SECURITY CERTIFICATES ON SIMS OF ELECTRONIC DEVICES

(71) Applicant: T-Mobile USA, Inc., Bellevue, WA (US)

(72) Inventors: Phani Ramisetty, Sammamish, WA (US); Mathew George, Kirkland, WA (US); Kyeong Hun An, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 77 days.

(21) Appl. No.: 16/455,390

(22) Filed: Jun. 27, 2019

(65) Prior Publication Data

US 2020/0413249 A1  Dec. 31, 2020

(51) Int. Cl.
  *H04W 56/00* (2009.01)
  *H04W 12/30* (2021.01)
  *H04L 9/00* (2022.01)
  *H04L 29/06* (2006.01)
  *H04W 12/069* (2021.01)

(52) U.S. Cl.
  CPC ............. *H04W 12/35* (2021.01); *H04L 9/006* (2013.01); *H04L 63/0823* (2013.01); *H04L 63/0853* (2013.01); *H04W 12/069* (2021.01)

(58) Field of Classification Search
  CPC .......... H04W 12/0023; H04W 12/0609; H04L 9/006; H04L 63/0823; H04L 63/0853
  USPC ........................................................ 370/329
  See application file for complete search history.

(56) References Cited

U.S. PATENT DOCUMENTS

| | | | | |
|---|---|---|---|---|
| 10,546,222 | B1* | 1/2020 | Milner | H04L 63/0435 |
| 2012/0011572 | A1* | 1/2012 | Chew | H04W 4/00 726/4 |
| 2013/0267199 | A1* | 10/2013 | Kamal | H04W 12/35 455/410 |
| 2015/0223063 | A1* | 8/2015 | Hong | H04W 12/35 726/9 |
| 2015/0289134 | A1* | 10/2015 | Johnston | H04M 1/72463 380/270 |
| 2016/0087972 | A1* | 3/2016 | Ahmavaara | H04L 63/205 726/10 |
| 2017/0289804 | A1* | 10/2017 | Kovacevic | G06F 21/575 |

* cited by examiner

*Primary Examiner* — Sai Ming Chan
(74) *Attorney, Agent, or Firm* — Lee & Hayes, P.C.

(57) ABSTRACT

Systems and methods discussed herein are directed to handling the identity and authentication of server security certificates on SIMs, and establishing secure channels with cloud servers via a wireless communication network using the security certificates and Public Key Infrastructure (PKI) libraries on SIMs. A mechanism to manage the security certificates on SIMs using an Over-the-Air (OTA) platform of the wireless communication network and certificate authority network elements is provided. Multiple cloud systems and their cloud servers are supported by storing multiple cloud certificates on SIMs and enabling features of a dynamic selection of the appropriate server certificate by the OTA platform for secure communication. Accordingly, electronic devices may be used within the wireless communication network for exchanging data with multiple cloud servers without changing codes/software devices, SIMs, etc.

19 Claims, 8 Drawing Sheets

PROVIDING MULTIPLE SERVER SECURITY CERTIFICATES ON SIMS OF ELECTRONIC DEVICES

BACKGROUND

Electronic devices are increasingly able to communicate with other entities, e.g., other electronic devices. Many of these devices are referred to as "connected devices," such as, for example, devices configured as Internet of things (IoT) devices, machine-to-machine (M2M) devices, etc. Such devices, as well as mobile communication devices, such as, for example, smart phones, portable computers, notebooks, laptops, etc., and other types of computing devices, both mobile and stationary, often communicate with other entities, e.g., servers, other similar devices, etc., over the Internet via wireless communication networks.

Communication by such devices generally includes an exchange of data. Thus, the electronic devices often communicate via a wireless communication network through servers that are often part of a "cloud" system, e.g., data centers available to many users over the Internet. By communicating with such cloud servers, the electronic devices have the ability to transmit and receive data to/from the servers over the Internet via the wireless communication network. With the increased number of IoT and M2M devices exchanging sensitive data with cloud servers, in order to ensure the security of data communication between the device and the server is essential. Thus, security is often handled by operators of the cloud system and its cloud servers using security certificates provided by the operators of the cloud systems. Each cloud system generally has its own security certificate for its cloud servers. A security certificate may be included on an electronic device's Subscriber Identity Module (SIM). Currently, each SIM only has one such certificate. Thus, each electronic device is only capable of exchanging data with a particular cloud system. If for some reason, the electronic device is operating via a wireless communication network that only uses a particular cloud system and the operator of the wireless communication network changes cloud systems, then the electronic device may need to be replaced.

Thus, electronic devices that are intended for a particular area within a wireless communication network that utilizes a particular cloud system are manufactured such that the SIM includes the security certificate for that particular cloud system, while an electronic device that is intended for use within another area of the wireless communication network that utilizes a different cloud system is manufactured such that the SIM includes a different security certificate that is useful for the other cloud system. The electronic devices are thus distributed to users accordingly for use within particular areas. If for some reason something changes with regard to the cloud system used by the wireless communication network within an area, the electronic device may need to be replaced.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
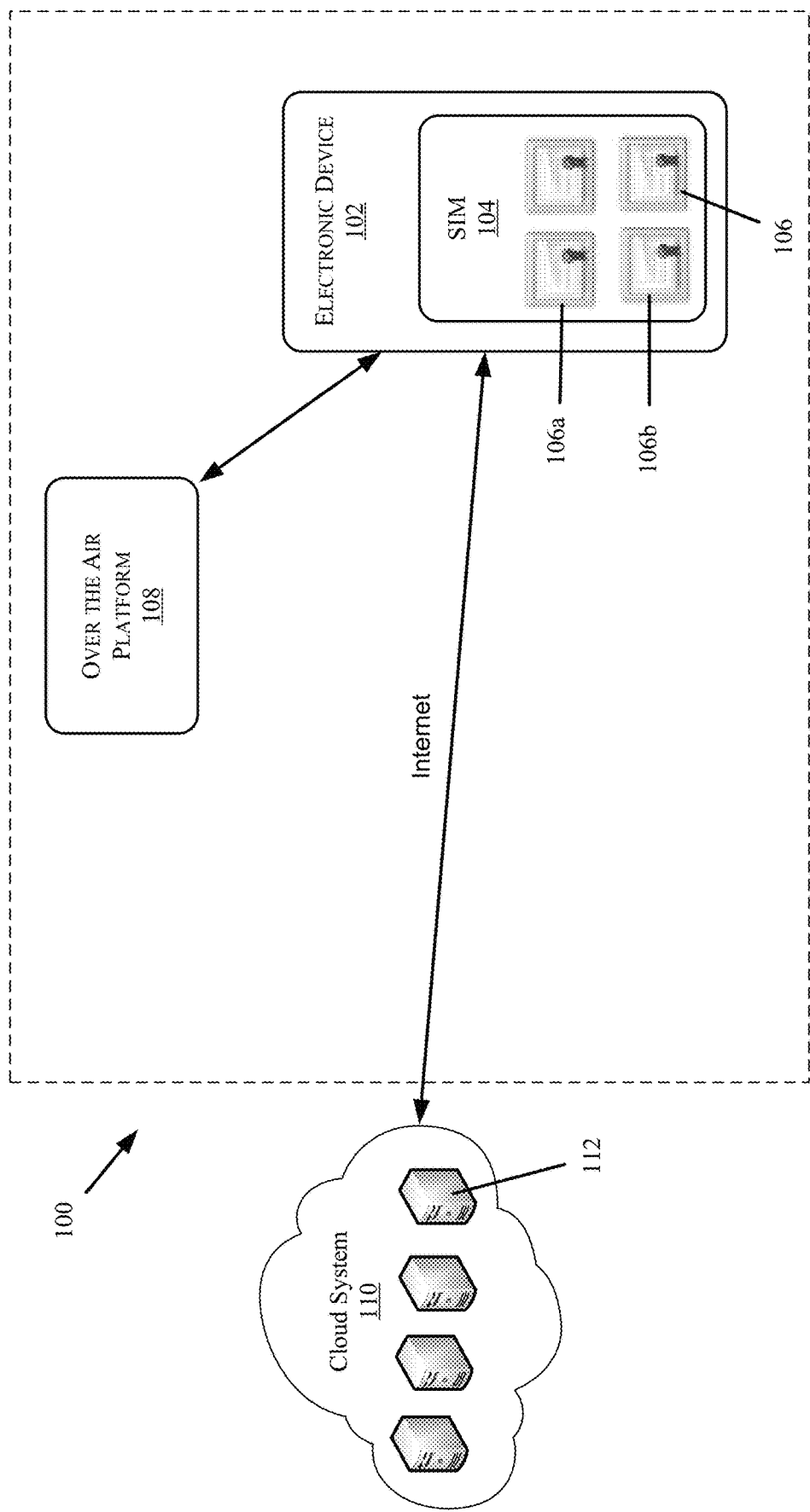
FIG. 1 is a pictorial diagram of a portion of an example wireless communication network configured to manage server security certificates on SIMs of electronic devices, in accordance with various configurations.

Systems and methods discussed herein are directed to handling the identity and authentication of server security certificates on SIMs, and establishing secure channels with cloud servers via a wireless communication network using the security certificates and Public Key Infrastructure (PKI) libraries on SIMs. A mechanism to manage the security credentials using an Over-the-Air (OTA) platform of the wireless communication network and certificate authority network elements is provided. A mechanism is also provided to dynamically select the security credentials based on logic initiated by the wireless communication network.

For example, in configurations, multiple cloud systems and their cloud servers are supported by storing multiple cloud certificates on SIMs and enabling features of a dynamic selection of the appropriate server certificate by the OTA platform of the for secure communication. Accordingly, each electronic device may be used within the wireless communication network for exchanging data with multiple cloud servers without changing codes/software devices, SIMs, etc. Additionally, in configurations, the OTA platform of the wireless communication network may send commands such that additional security certificates can be stored and security certificates may be configured so that the correct server certificate is used for secure communication. Thus, electronic devices and/or their operating software do not need to be changed or reconfigured to be able to connect to different cloud systems over the Internet via a wireless communication network.

In particular, multiple server security certificates that pertain to different cloud systems and their cloud servers are stored on electronic devices' SIMs. At the manufacturing stage for an electronic device (or the manufacturing stage for a SIM card for an electronic device), the SIMs can be produced with multiple server security certificates included thereon. Additional server security certificates may be provided via the OTA platform of a wireless communication network within which the electronic device is being used. Additionally, the OTA platform may update the configuration of the SIM so that the appropriate server security certificate is utilized when the electronic device is operating within the wireless communication network. The OTA platform may send configuration commands to the SIM to let the SIM, and thereby the electronic device, know which server security certificate needs to be used for PKI/Transport Layer Security (TLS) secure communication between the electronic device and the appropriate cloud system and cloud servers when exchanging data over the Internet via the wireless communication network.

In configurations, electronic devices (or SIM cards) may be manufactured such that the SIMs include multiple server security certificates. Each server security certificate corresponds to a cloud system operated by a particular entity. For example, a server security certificate A pertains to cloud system A, while a server certificate B pertains to cloud system B. When an electronic device in the form of a connected device, e.g., an Internet of things (IoT) device, a machine-to-machine (M2M) device, a portable electronic device such as, for example, a smartphone, a laptop, a notebook, or other computing device, operates within a wireless communication network, when the electronic devices wishes to exchange data over the Internet, e.g., with a cloud system, the appropriate server security certificate needs to be used so that the communication with the cloud system may be authenticated and secure. Thus, when an electronic device registers for use within the wireless network, the OTA platform of the wireless communication network instructs and/or configures the SIM of the electronic device so that the appropriate server security certificate is used when the electronic device wishes to exchange data over the Internet via the wireless communication network with a cloud server or cloud servers of a cloud system used by the wireless communication network.

In configurations, the electronic device may initially communicate with cloud system A within the wireless communication network. Cloud system A may need to update and/or configure the server security certificate for cloud system A. Cloud system A may provide the updates to the operator of the wireless communication network and the OTA platform of the wireless communication network may update and/or configure the SIM of the electronic device with the updates from cloud system A. Also, the operator of the wireless communication network may change cloud systems for use within the wireless communication network for data exchange over the Internet. For example, the wholesale provider of data services for electronic devices may initially use cloud system A. However, the wholesale provider may switch cloud systems and begin to use cloud system B. Thus, the OTA platform of the wireless communication network may instruct/configure the SIM to change from using the server security certificate A for cloud system A and use the server security certificate B for cloud system B when exchanging data over the Internet via the wireless communication network.

When the electronic device wishes to exchange data with a cloud server, the electronic device may send an access request to the appropriate cloud system, e.g., one or more cloud servers within the cloud system. The cloud server may send back a signature. The electronic device/SIM checks the currently selected server security certificate that is configured for use on the SIM and uses it to verify the cloud server signature. The device/SIM then generates a client signature and sends it to the cloud server. The cloud server verifies the client signature using a public key in the client security certificate. Once this "handshake" process is complete, the SIM may generate ciphered or encrypted messages using a session key and encrypts the session key using the cloud server's public key for the currently selected server security certificate. The ciphered message is then sent to the cloud server, which decrypts the session key using its private key and decrypts data using the session key.

Thus, data may be exchanged between the electronic device and the cloud system securely. Furthermore, if updates for a server security certificate need to be made, the OTA platform may update the appropriate server security certificates dynamically. Also, if for some reason a different server security certificate needs to be used, e.g., a cloud system being used for data exchange over the Internet via the wireless communication network has changed, then the OTA platform may configure the SIMs of the electronic devices to change and use the appropriate server security certificate.

FIG. 1 schematically illustrates a portion of a wireless communication network 100. One or more electronic devices 102 each include a subscriber identity module (SIM) 104. The one or more electronic devices 102 may be in the form of a connected device, e.g., configured as an Internet of things (IoT) device, configured as a machine-to-machine (M2M) device, etc., and/or may also be in the form of a portable electronic device such as, for example, a smartphone, a laptop, a notebook, or other computing device. The SIM 104 may be in the form of a SIM card, an embedded SIM, embedded universal integrated circuit card (eUICC), etc. Each SIM 104 includes multiple server security certificates 106. An Over the Air (OTA) platform 108 is included within the wireless communication network 100 and may be configured to operate on one or more servers of the wireless communication network 100. The OTA platform 108 communicates with the electronic device 102 to manage the SIM 104 of the electronic device 102.

A cloud system 110 is illustrated in FIG. 1. The cloud system 110 is generally a separate entity, but in configurations may be part of the wireless communication network 100. Generally, the cloud system 110 is a data center available to many users over the Internet and is made up of a plurality of cloud servers 112. The electronic device 102 communicates with the cloud servers 112 to exchange data. Thus, when the electronic device 102 wishes to exchange data with the cloud system 110, the SIM 104 of the electronic device 102 needs to be configured to use the appropriate server security certificate 106 for the cloud system 110. For example, if the cloud system 110 is operated by entity A, e.g., the cloud system 110 is cloud system A, then the electronic device 102 needs to utilize server security certificate 106a, which corresponds to cloud system A, in order to exchange data with servers of cloud system A. Likewise, if the cloud system 110 is operated by entity B, e.g., the cloud system 110 is cloud system B, then the electronic device 102 needs to utilize the server security certificate 106b, which corresponds to the cloud system B, in order to exchange data with servers of cloud system B.

Thus, when the electronic device 102 registers for service within the wireless communication network 100, the OTA platform 108 configures the SIM 104 so that the electronic device 102 uses the server security certificate for the appropriate cloud system, e.g., either server security certificate 106a or security certificate 106b, for example. Generally, the electronic device 102 cannot configure its own SIM 104 and thus, the OTA platform 108 needs to configure the SIM 104.

Generally, wireless communication networks only use one cloud system 110 for exchanging data with electronic devices 102 over the Internet via the wireless communication network 100. Thus, the OTA platform 108 generally only needs to configure the SIM 104 initially and does not need to continually change the SIM 104. However, since many wireless communication networks are very large, different portions of a wireless communication network, e.g., the wireless communication network 100, may utilize different cloud systems 110, e.g., cloud system A and cloud system B. Depending on which portion of the wireless communication network 100 the electronic device 102 is primarily to be used, the OTA platform 108 configures the SIM 104 accordingly. In configurations, the OTA platform 108 may include a module for managing SIMs 104 as described herein, as well as performing other tasks with respect to SIMs 104.

Figure 2:
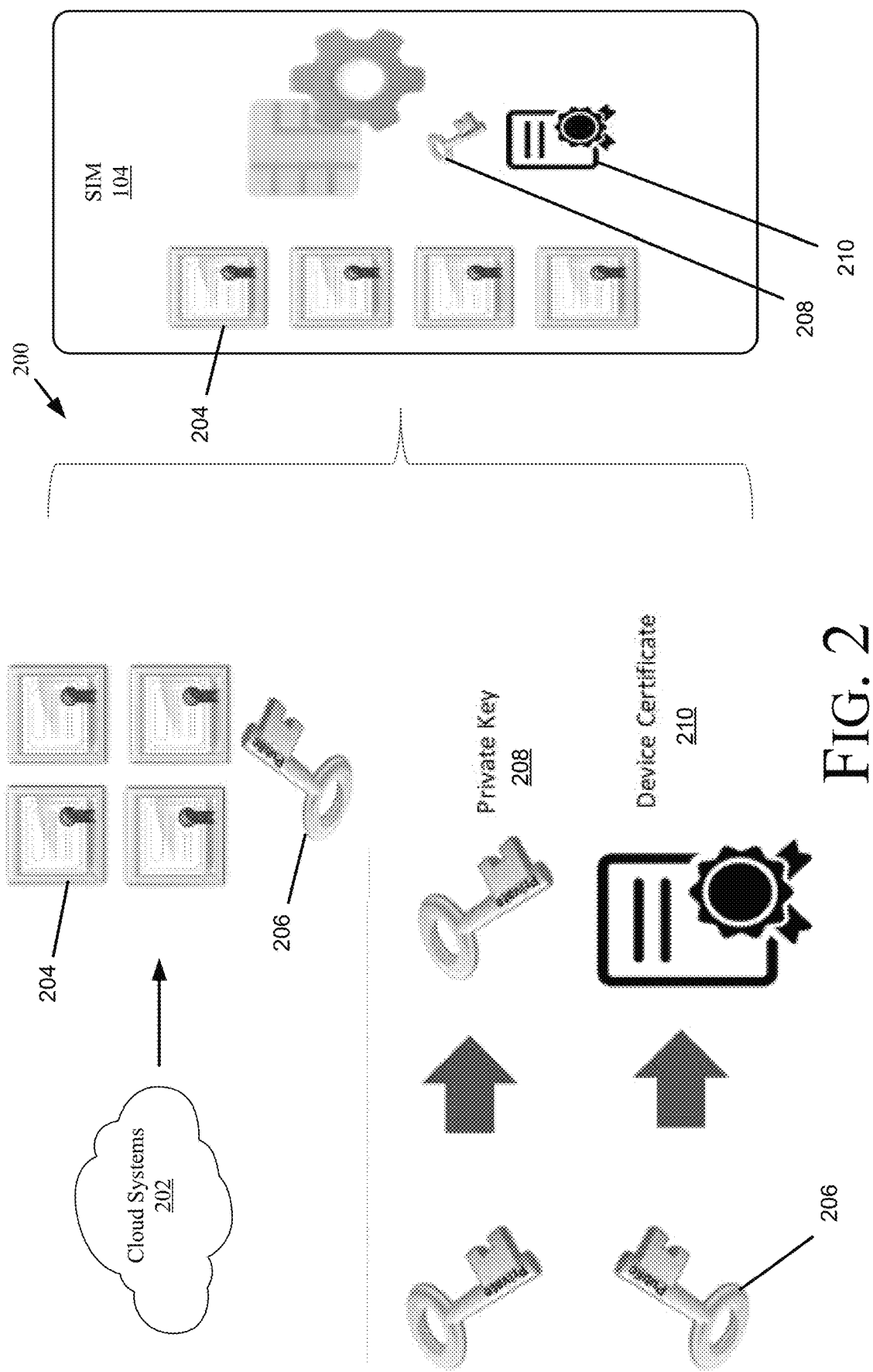
FIG. 2 is pictorial diagram of an example of creating a SIM with multiple server security certificates at the time of producing or manufacturing the electronic device and/or the SIM, in accordance with various configurations.

FIG. 2 schematically illustrates an example 200 of creating a SIM 104 with multiple server security certificates 106 at the time of producing or manufacturing the electronic device 102 and/or the SIM 104. As may be seen, various cloud systems 202 provide cloud security certificates 204 (also referred to herein as server security certificates 106). When providing the cloud security certificates 204, the cloud systems 202 may also provide an appropriate public key 206. In configurations, the public key 206 may be part of the cloud security certificate 204.

An operator of the wireless communication network 100 provides a private key 208 to the SIM 104 and a device security certificate 210. The public key 206 is also provided within the device security certificate 210. The various cloud security certificates 204, the private key 208 and the device security certificate 210 are stored on the SIM 104.

Figure 3:
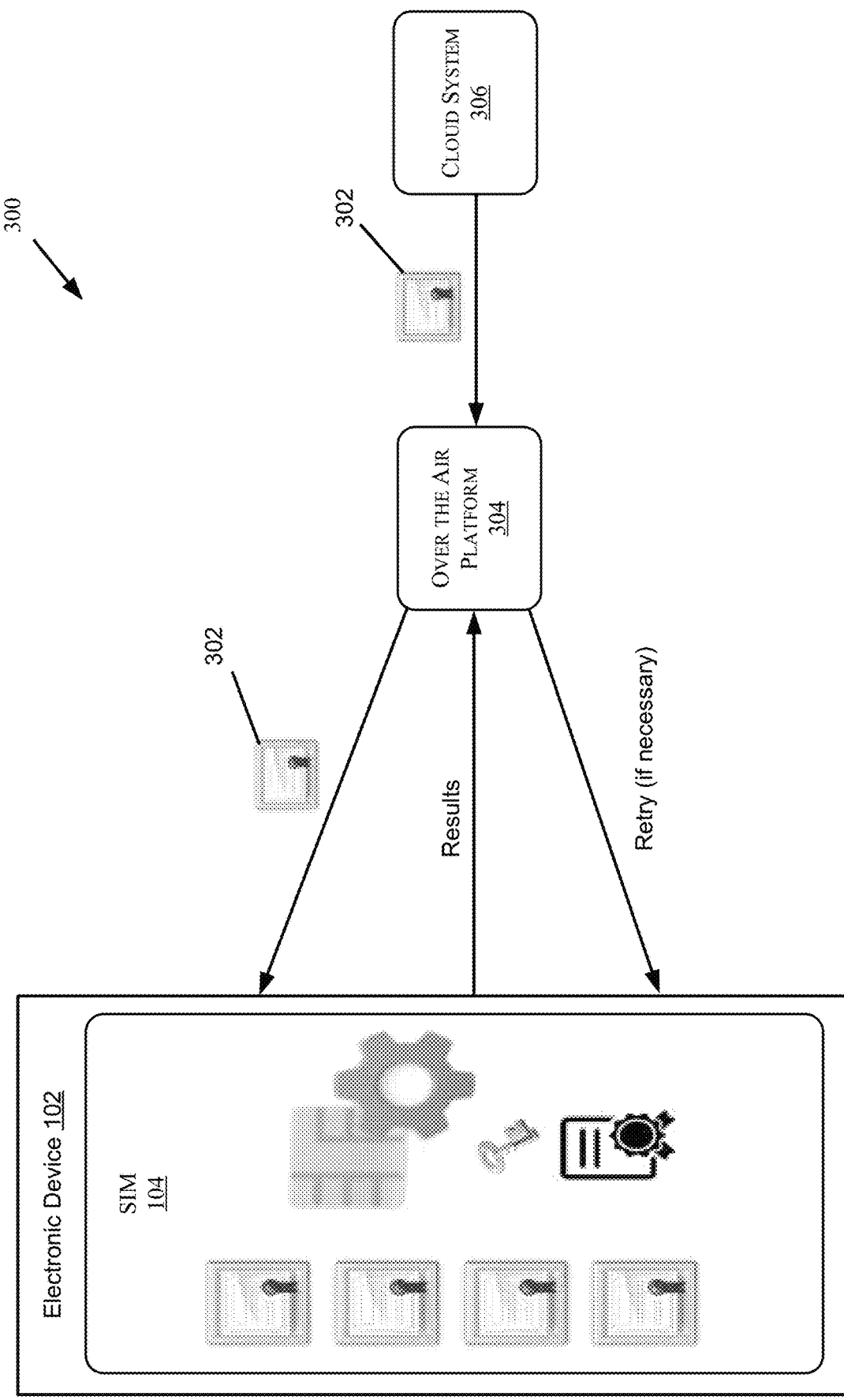
FIG. 3 is a pictorial diagram of an example of adding a new server security certificate to a SIM of an electronic device, in accordance with various configurations.

FIG. 3 schematically illustrates an example 300 of adding a new server security certificate 302 to a SIM 104 of an electronic device 102. In accordance with configurations, the new server security certificate 302 may be added to the SIM 104 by an OTA platform 304, e.g., OTA platform 108, of the wireless communication network 100. The new server security certificate 302 may be provided by a cloud system 306, e.g., cloud system 110. The OTA platform 304 may receive the new server security certificate 302, either from the cloud system 306 or from another entity within the wireless communication network 100 that receives the new server security certificate 302 from the cloud system 306. The OTA platform 304 sends, via the wireless communication network 100, the new server security certificate 302 for storage on the SIM 104. The new server security certificate 302 may be stored within the SIM 104. The electronic device 102/SIM 104 responds back to the OTA platform 304 with results. For example, if the SIM 104 is full, then the electronic device 102/SIM 104 may respond that the attempt to store the new server security certificate 302 has failed. The OTA platform 304 may then delete a server security certificate from the SIM 104, e.g., an out-of-date server security certificate or a server security certificate that has not been used for a long time, and instruct the SIM 104 to store the new server security certificate 302 by resending the new server security certificate 302 to the SIM 104. If the storage of the new server security certificate 302 is successful, then the SIM 104 may reply back to the OTA platform 304 with the results that storage of the new server security certificate 302 was successful.

In configurations, if the electronic device 102 is in a low power mode or "sleeping," then the SIM 104 may not be able to store the new server security certificate 302. Thus, if no response is received from the SIM 104, e.g., no results, then after a predetermined amount of time, the OTA platform 304 may attempt to retry providing the new server security certificate 302 to the SIM 104. Once successful, the SIM 104 may reply with the results to the OTA platform 304 of the success of storing the new server security certificate 302.

Figure 4:
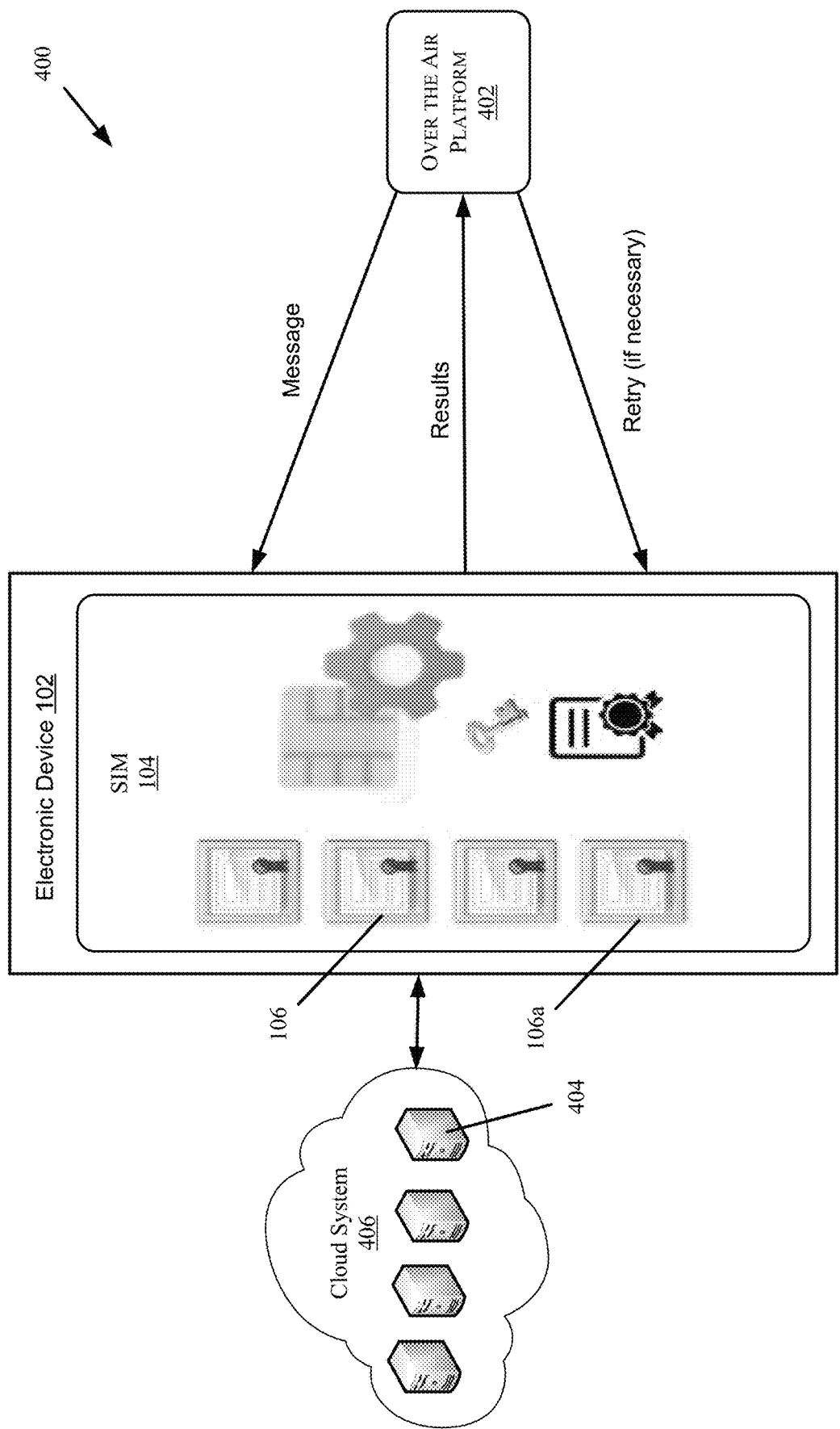
FIG. 4 is a pictorial diagram of an example flow for configuring a server security certificate selection on a SIM of an electronic device, in accordance with various configurations.

FIG. 4 schematically illustrates an example flow 400 for configuring a server security certificate selection on a SIM 104 of an electronic device 102. An OTA platform 402, e.g., OTA platform 108, sends a message to a SIM 104 of an electronic device 102 to use a particular server security certificate 106 when communicating with a cloud server or servers 404, e.g., cloud servers 112, of a cloud system 406, e.g., cloud system 110. The SIM 104 is then configured to utilize the server security certificate 106 when an electronic device 102 wishes to exchange data with the cloud system 406 over the Internet via the wireless communication network 100. For example, if the portion of the wireless communication network 100 in which the electronic device 102 is operating uses cloud system A, then the OTA platform 402 sends a message to the SIM 104 that server security certificate 106a should be used. If successful, the electronic device 102/SIM 104 responds back to the OTA platform 402 with results that the selection of server security certificate 106a was successful. If for some reason, the attempt to configure the SIM 104 to use server security certificate 106a is unsuccessful, then the electronic device 102/SIM 104 sends results indicating failure back to the OTA platform 402. Depending on the reason for the failure, e.g., the SIM 104 does not include server security certificate 106a, then the OTA platform 402 may retry. The retry may include, for example, sending, by the OTA platform 402, the server security certificate 106a to the SIM 104. The electronic device 102/SIM 104 may send results indicating success to the OTA platform 402. Likewise, if the electronic device 102 is sleeping and no results are received by the OTA platform 402 after a predetermined amount of time, the OTA platform 402 may retry to configure the SIM 104 to use server security certificate 106a.

Additionally, if the OTA platform 402 needs to update a server security certificate 106 on the SIM 104, then the OTA platform 402 may use a similar process. The OTA platform 402 may send the update for the server security certificate 106 to the SIM 104. Once successful, the electronic device 102/SIM 104 may respond back to the OTA platform 402. If results from the SIM 104 indicate that the attempt to update was not successful, or if after a predetermined amount of time the electronic device 102/SIM 104 does not respond with results to the OTA platform 402, then the OTA platform 402 may retry sending a message regarding the update(s) to the SIM 104 for the server security certificate 106.

Figure 5:
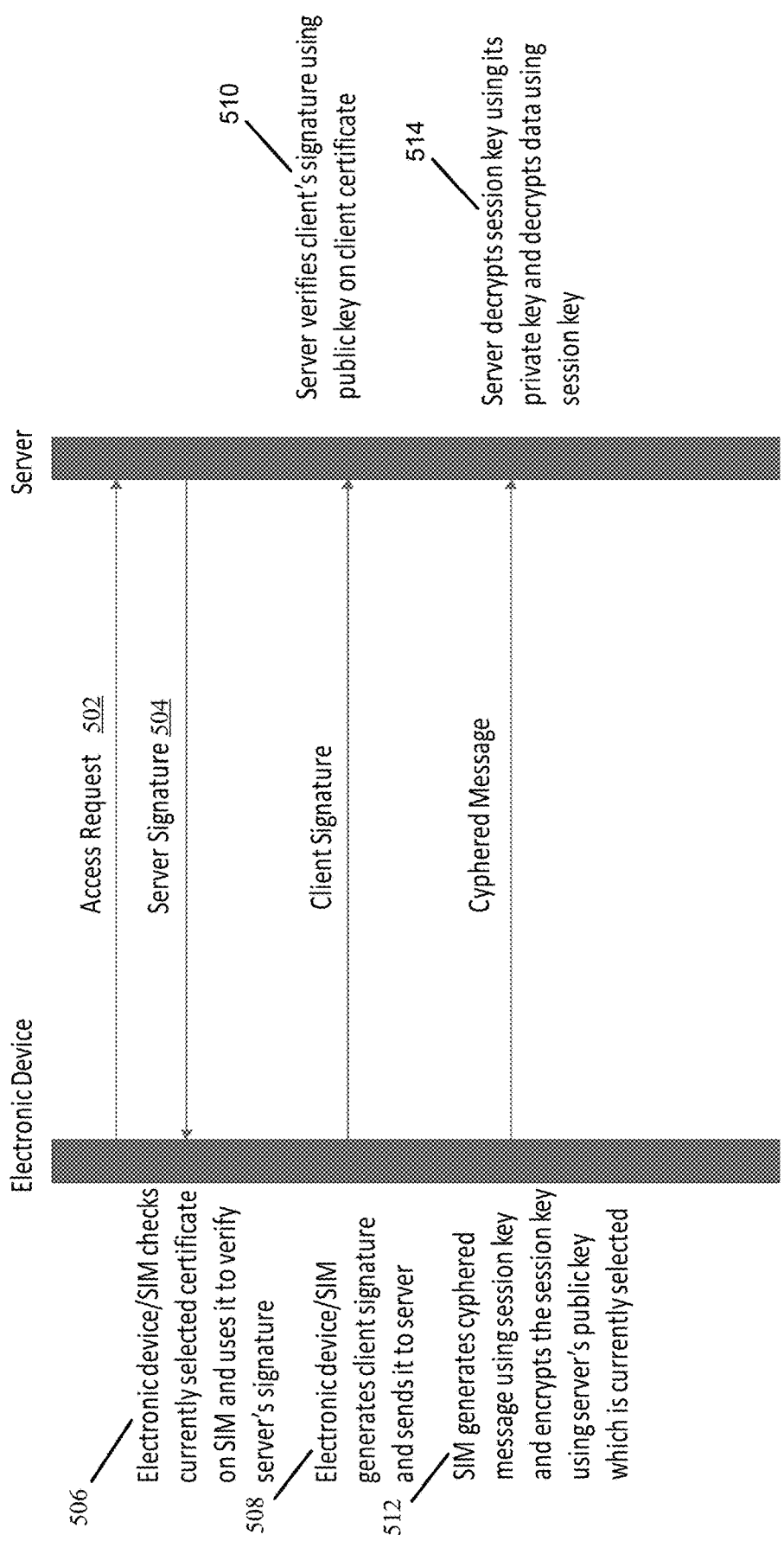
FIG. 5 is schematically illustrates a flow for a process of PKI/TLS between an electronic device/SIM and a server, in accordance with various configurations.

FIG. 5 schematically illustrates an example flow 500 for a process of PKI/TLS between an electronic device/SIM, e.g., electronic device 102/SIM 104 and a server, e.g., cloud server 112 of a cloud system 110. At 502, the electronic device may send an access request to the cloud server. At 504, the cloud server may send back a server signature. At 506, the electronic device/SIM checks a currently selected or active server security certificate, e.g., server security certificate 106, on the SIM and uses it to verify the server signature. At 508, the electronic device/SIM generates a client signature with a client certificate, e.g., device certificate 210, and sends the client signature to the cloud server. At 510, the client signature is verified by the cloud server using a public key, e.g., public key 206, on the client certificate. At 512, the SIM generates a cyphered message using a session key and encrypts the session key using the server's public key, e.g., public key 206, for the cloud system based on the currently selected or active server security certificate. The cyphered message is then sent to the cloud server 110 and at 514, the cloud server 112 decrypts the session key using its private key and decrypts data using the session key.

Figure 6:
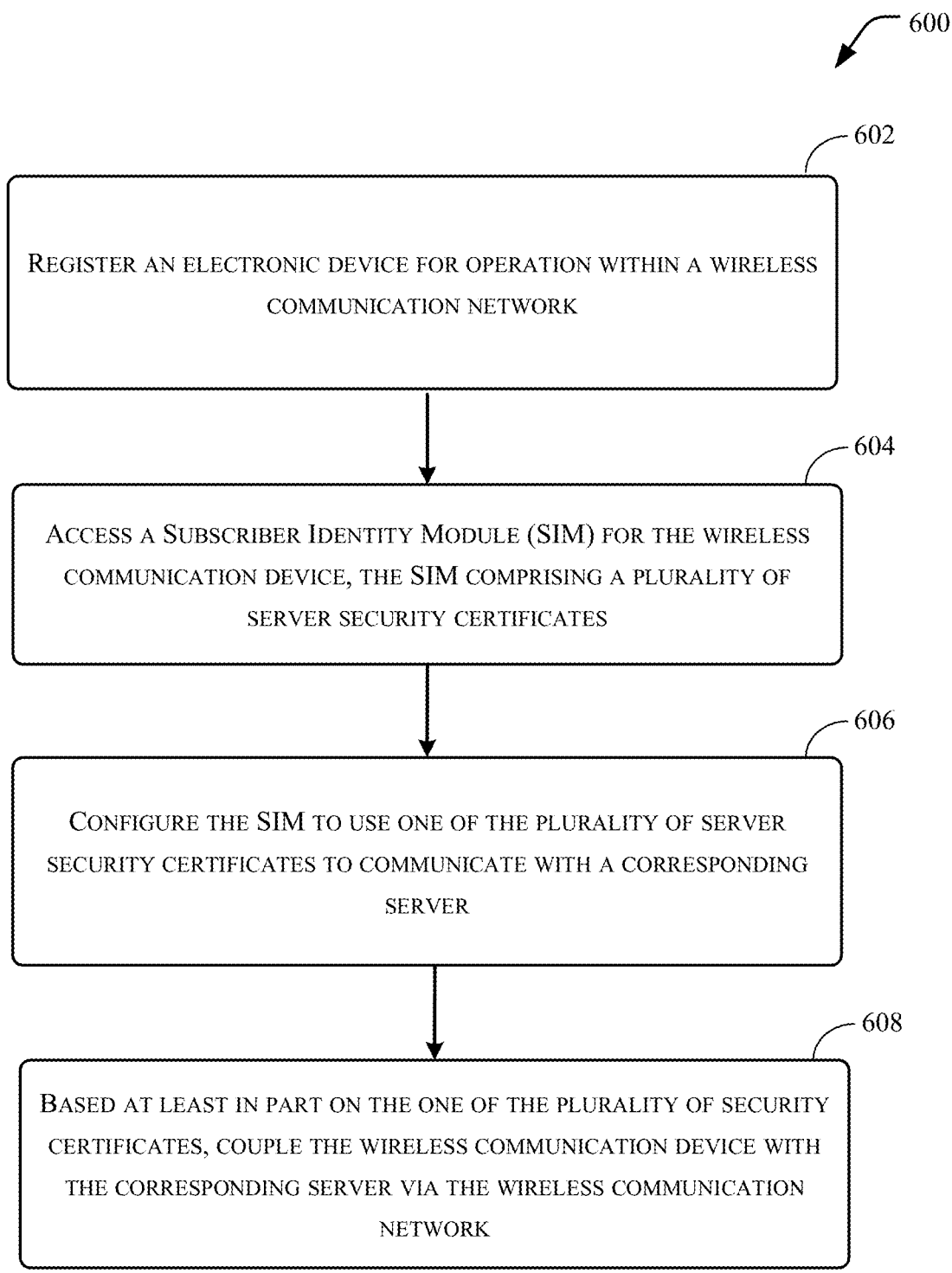
FIG. 6 is a flow diagram of an example process of accessing a SIM of an electronic device for accessing one of a plurality of server security certificates for communicating with a cloud server of a cloud system within a wireless communication network, in accordance with various configurations.

FIG. 6 is a flow diagram of an illustrative process that may be implemented within or in association with the arrangements and processes of FIGS. 1-5. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices.

FIG. 6 is a flow diagram illustrating an example method 600 of accessing a Subscriber Identity Module (SIM), e.g., SIM 104, of an electronic device, e.g., electronic device 102, for configuring the SIM to use one of a plurality of server security certificates, e.g., server security certificates 106, on the SIM to communicate with a cloud server, e.g., cloud server 112, of a cloud system, e.g., cloud system 110, over the Internet within a wireless communication network, e.g., wireless communication network 100. At block 602, the electronic device is registered for operation within the wireless communication network. At block 604, the SIM of the electronic device is accessed, where the SIM comprises the plurality of server security certificates.

At block 606, the SIM is configured to use one of the plurality of server security certificates to communicate with a corresponding server. For example, the accessed server security certificate may be used to generate secure data exchanges between the electronic device and a cloud server. At block 608, based at least in part on the one of the plurality of security certificates, the electronic device is coupled with the corresponding server via the wireless communication network.

Accordingly, data may be exchanged between electronic devices and cloud systems securely. Furthermore, if updates for a server security certificate on SIMs need to be made, the OTA platform may update the appropriate server security certificates dynamically. The OTA can also provide new server security certificates to the SIMs. Also, if for some reason a different server security certificate needs to be used, e.g., a cloud system being used for data exchange over the Internet via the wireless communication network has changed, then the OTA platform may configure the SIMs of the electronic devices to change and use the appropriate server security certificate.

Electronic device 102 may be implemented as any suitable device that may be configured as a "connected device," e.g., an Internet of things (IoT) device, a machine to machine (M2M) device, etc. The electronic device 102 may also be implemented as a mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the electronic device 102 as being "mobile" (i.e., configured to be carried and moved around), it is to be appreciated that the electronic device 102 may represent various types of communication devices that are generally stationary as well, such as televisions, desktop computers, game consoles, set top boxes, and the like. In this sense, the terms "communication device," "wireless device," "wireline device," "mobile device," "computing device," and "user equipment (UE)" may be used interchangeably herein to describe any communication device capable of performing the techniques described herein. Furthermore, the electronic device 102 may be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), 5G, IEEE 802.1x protocols, WiMAX, Wi-Fi, and/or any future IP-based network technology or evolution of an existing IP-based network technology.

Figure 7:
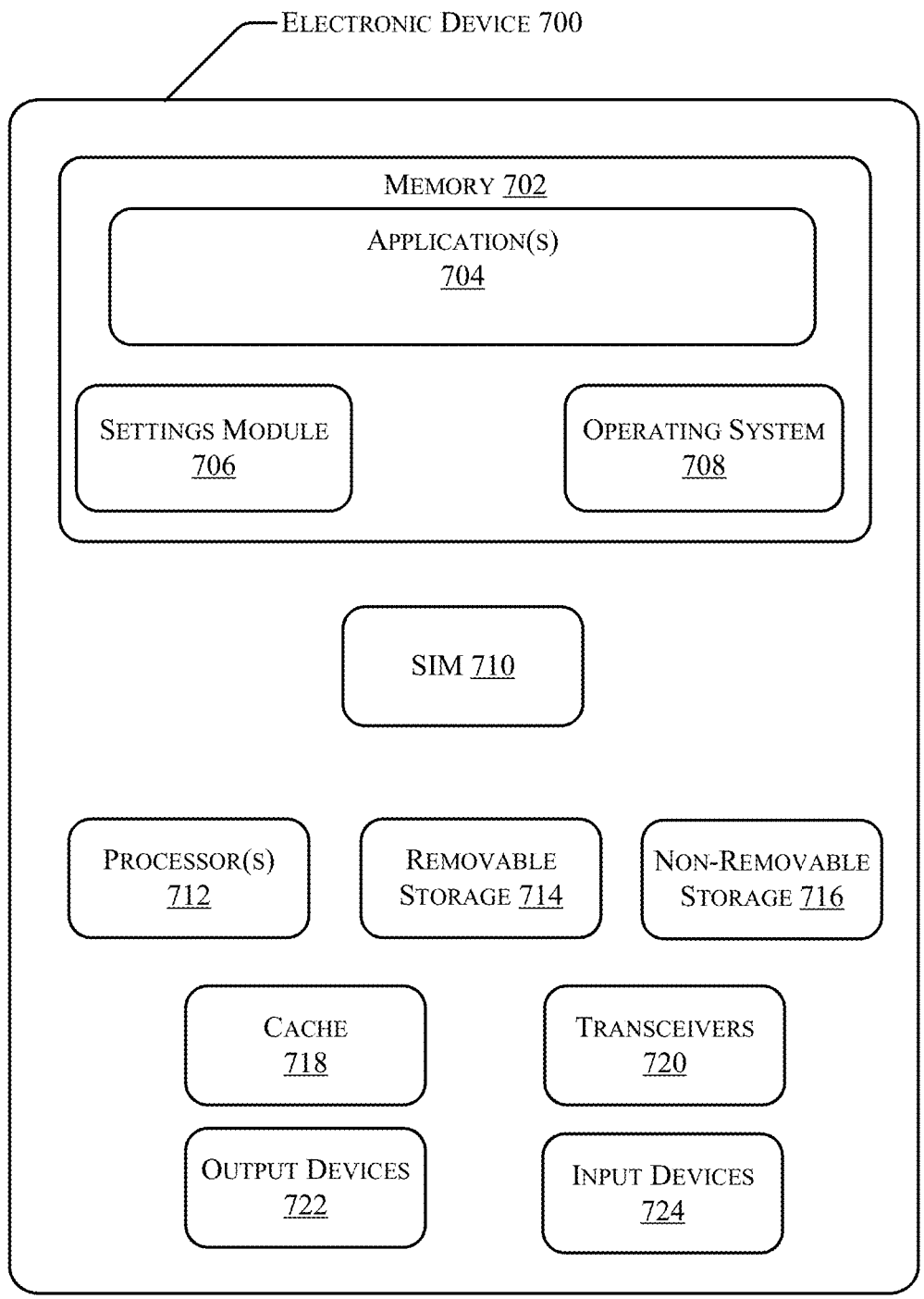
FIG. 7 schematically illustrates a component level view of an example electronic device configured for use in the wireless communication network of FIG. 1, in accordance with various configurations.

FIG. 7 schematically illustrates a component level view of an example electronic device 700, such as electronic device 102, configured to function within wireless communication network 100. The electronic device 700 may include more or less components depending on the type of electronic device. As illustrated, the electronic device 700 comprises a system memory 702, e.g., computer-readable media, storing application(s) 704. The mobile device also comprises a settings module 706, and an operating system 708. The electronic device 700 also includes a SIM 710, e.g., SIM 104. Also, the electronic device 700 includes processor(s) 712, a removable storage 714, anon-removable storage 716, cache 718, transceivers 720, output device(s) 722, and input device(s) 724. In various implementations, system memory 702 is volatile (such as RAM), non-volatile (such as ROM, flash memory, etc.) or some combination of the two. In some implementations, the processor(s) 712 is a central processing unit (CPU), a graphics processing unit (GPU), or both CPU and GPU, or any other sort of processing unit.

The electronic device 700 may also include additional data storage devices (removable and/or non-removable) such as, for example, magnetic disks, optical disks, or tape. Such additional data storage may include removable storage 714 and non-removable storage 716. Additionally, the electronic device 700 includes cache 718.

Non-transitory computer-readable media may include volatile and nonvolatile, removable and non-removable tangible, physical media implemented in technology for storage of information, such as computer readable instructions, data structures, program modules, or other data. System memory 702, removable storage 714, non-removable storage 716 and cache 718 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the electronic device 700. Any such non-transitory computer-readable media may be part of the electronic device 700. The processor(s) 712 may be configured to execute instructions, which may be stored in the non-transitory computer-readable media or in other computer-readable media accessible to the processor(s) 712.

In some implementations, the transceivers 720 include any sort of transceivers known in the art. For example, the transceivers 720 may include a radio transceiver that performs the function of transmitting and receiving radio frequency communications via an antenna (not shown). Also, or alternatively, the transceivers 720 may include wireless modem(s) to facilitate wireless connectivity with other computing devices. Further, the transceivers 720 may include wired communication components, such as an Ethernet port, for communicating with other networked devices.

In some implementations, the output devices 722 include any sort of output devices known in the art, such as a display (e.g., a liquid crystal display), speakers, a vibrating mechanism, or a tactile feedback mechanism. Output devices 722 also include ports for one or more peripheral devices, such as headphones, peripheral speakers, or a peripheral display.

In various implementations, input devices 724 include any sort of input devices known in the art. For example, input devices 724 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 724 may be used to enter preferences of a user of the electronic device 700 to define how the user wishes certain calls from third parties to be handled by the wireless communication network, as previously described herein.

Figure 8:
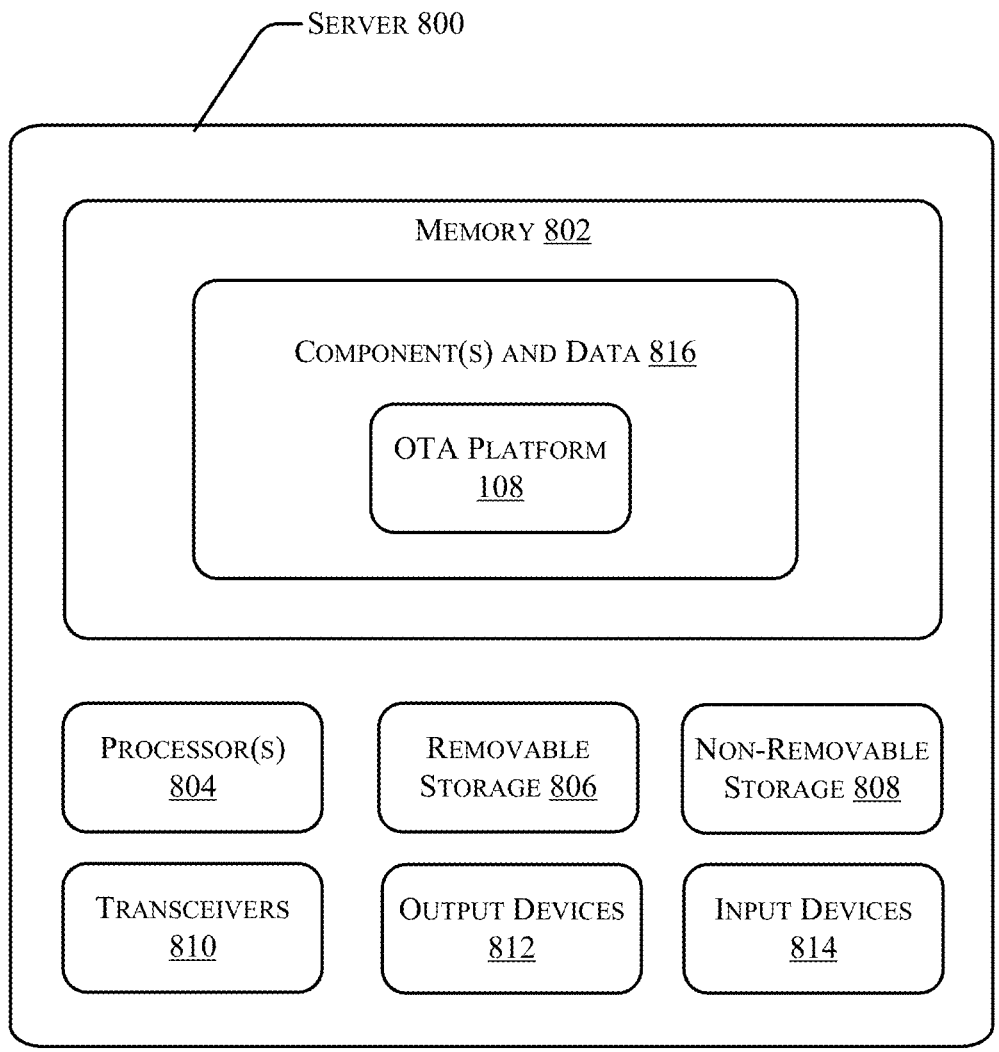
FIG. 8 schematically illustrates a component level view of a server configured for use in the wireless communication network of FIG. 1 to provide various services of the wireless communication network of FIG. 1, in accordance with various configurations.

FIG. 8 illustrates a component level view of a server 800 configured for use within a wireless communication network, e.g., wireless communication network 100 in order to provide various services within the wireless communication network, according to the techniques described herein. As illustrated, the server 800 comprises a system memory 802 that may store one or more components and/or applications and data 816 for interacting with electronic devices 700, e.g., electronic devices 102, as described herein. For example, the one or more components and/or applications and data 816 may include the OTA platform 108. Also, the server 800 may include processor(s) 804, a removable storage 806, a non-removable storage 808, transceivers 810, output device(s) 812, and input device(s) 814.

In various implementations, system memory 802 is volatile (such as RAM), non-volatile (such as ROM, flash memory, etc.), or some combination of the two. In some implementations, the processor(s) 804 is a Central Processing Unit (CPU), a Graphics Processing Unit (GPU), or both CPU and GPU, or any other sort of processing unit.

The server 800 may also include additional data storage devices (removable and/or non-removable) such as, for example, magnetic disks, optical disks, or tape. Such additional storage is illustrated in FIG. 8 by removable storage 806 and non-removable storage 808. The one or more of the memory 802, the removable storage 806 and/or the non-removable 808 may include module(s) and data 816 (illustrated in the memory 802). The module(s) and data 816 may include instructions executable by, for example, the processor(s) 804.

Non-transitory computer-readable media may include volatile and nonvolatile, removable and non-removable tangible, physical media implemented in technology for storage of information, such as computer readable instructions, data structures, program modules, or other data. System memory 802, removable storage 806 and non-removable storage 808 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 800. Any such non-transitory computer-readable media may be part of the server 800.

In some implementations, the transceivers 810 include any sort of transceivers known in the art. For example, the transceivers 810 may include wired communication components, such as an Ethernet port, for communicating with other networked devices. Also, or instead, the transceivers 810 may include wireless modem(s) to facilitate wireless connectivity with other computing devices. Further, the transceivers 810 may include a radio transceiver that performs the function of transmitting and receiving radio frequency communications via an antenna.

In some implementations, the output devices 812 include any sort of output devices known in the art, such as a display (e.g., a liquid crystal display), speakers, a vibrating mechanism, or a tactile feedback mechanism. Output devices 812 also include ports for one or more peripheral devices, such as headphones, peripheral speakers, or a peripheral display.

In various implementations, input devices 814 include any sort of input devices known in the art. For example, input devices 814 may include a camera, a microphone, a keyboard/keypad, a computer mouse, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 702 and memory 802 are examples of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-6. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed by one or more servers, the method comprising:
   registering an electronic device for operation within a wireless communication network via a Subscriber Identity Module (SIM) based authentication;
   accessing a SIM for the electronic device, the SIM comprising a plurality of server security certificates;
   determining a first server security certificate of the plurality of server security certificates is out of date;
   causing the SIM to update with a new server security certificate associated with a corresponding server;
   initiating a storage of the new server security certificate on the SIM;
   receiving a reply from the SIM that the attempt to store the new server security certificate on the SIM has failed;
   causing, in response to receiving the reply, the SIM to remove the first server security certificate;
   causing the SIM to store the new server security certificate;
   configuring the SIM to use the new server security certificate of the plurality of server security certificates to communicate with the corresponding server; and
   based at least in part on the one of the plurality of server security certificates, coupling the electronic device with the corresponding server via the wireless communication network.

2. The method of claim 1, wherein causing the SIM to update the new server security certificate comprises:
   receiving the new server security certificate from a network;
   sending, via the wireless communication network, the new server security certificate to the electronic device; and
   receiving a first indication regarding the updating of the SIM with the new server security certificate.

3. The method of claim 2, wherein the first indication indicates failure with respect to updating the SIM with the new server security certificate, and the method further comprises:
   re-sending, via the wireless communication network, the new server security certificate to the electronic device; and
   receiving a second indication regarding success of updating the SIM with the new server security certificate.

4. The method of claim 1, further comprising:
   selecting another one of the plurality of server security certificates, the other one of the plurality of server security certificates allowing for secure communication with another corresponding server; and
   based at least in part on the another one of the plurality of server security certificates, coupling the electronic device with the another corresponding server.

5. The method of claim 4, wherein selecting another one of the plurality of server security certificates comprises:
   sending, via the wireless communication network, an identification of the another one of the plurality of server security certificates to the electronic device; and
   receiving a first indication regarding changing from the one of the plurality of server security certificates to the another one of the plurality of server security certificates.

6. The method of claim 5, wherein the first indication indicates failure with respect to changing from the one of the plurality of server security certificates to the another one of the plurality of server security certificates, and the method further comprises:
   re-sending, via the wireless communication network, the identification of the another one of the plurality of server security certificates to the electronic device; and
   receiving a second indication regarding success of changing from the one of the plurality of server security certificates to the another one of the plurality of server security certificates.

7. An apparatus configured for operation within a wireless communication network, the apparatus comprising:
   one or more processors; and
   a non-transitory storage medium comprising instructions stored thereon, the instructions being executable by the one or more processors to:

register an electronic device for operation within the wireless communication network;
access a Subscriber Identity Module (SIM) for the electronic device, the SIM comprising a plurality of server security certificates;
determine a first server security certificate of the plurality of server security certificates is out of date;
update the SIM to add a new server security certificate associated with a corresponding server;
initiating a storage of the new server security certificate on the SIM;
receive a reply that the attempt to store the new server security certificate on the SIM has failed;
cause, in response to receiving the reply, the SIM to remove the first server security certificate;
cause the SIM to store the new server security certificate;
configure the SIM to use the new server security certificate of the plurality of server security certificates to communicate with the corresponding server; and
based at least in part on the one of the plurality of server security certificates, couple the electronic device with the corresponding server via the wireless communication network.

8. The apparatus of claim 7, wherein the instructions are further executable by the one or more processors to:
update the SIM with a new server security certificate.

9. The apparatus of claim 8, wherein the instructions are further executable by the one or more processors to update the SIM with the new server security certificate by:
receiving the new server security certificate from a network;
sending, via the wireless communication network, the new server security certificate to the electronic device; and
receiving a first indication regarding the updating of the SIM with the new server security certificate.

10. The apparatus of claim 9, wherein the first indication indicates failure with respect to updating the SIM with the new server security certificate, and wherein the instructions are further executable by the one or more processors to:
re-send, via the wireless communication network, the new server security certificate to the electronic device; and
receive a second indication regarding success of updating the SIM with the new server security certificate.

11. The apparatus of claim 7, wherein the instructions are further executable by the one or more processors to:
update one or more of the plurality of server security certificates.

12. The apparatus of claim 7, wherein the instructions are further executable by the one or more processors to:
select another one of the plurality of server security certificates, the another one of the plurality of server security certificates allowing for secure communication with another corresponding server; and
based at least in part on the another one of the plurality of server security certificates, couple the electronic device with the another corresponding server.

13. The apparatus of claim 12, wherein the instructions are further executable by the one or more processors to select another one of the plurality of server security certificates by:
sending, via the wireless communication network, an identification of the another one of the plurality of server security certificates to the electronic device; and
receiving a first indication regarding changing from the one of the plurality of server security certificates to the another one of the plurality of server security certificates.

14. The apparatus of claim 13, wherein the first indication indicates failure with respect to changing from the one of the plurality of server security certificates to the another one of the plurality of server security certificates, and wherein the instructions are further executable by the one or more processors to:
re-send, via the wireless communication network, the identification of the another one of the plurality of server security certificates to the electronic device; and
receive a second indication regarding success of changing from the one of the plurality of server security certificates to the another one of the plurality of server security certificates.

15. A non-transitory storage medium comprising instructions stored thereon, the instructions being executable by one or more processors to:
register an electronic device for operation within a wireless communication network;
access a Subscriber Identity Module (SIM) for the electronic device, the SIM comprising a plurality of server security certificates;
determine a first server security certificate of the plurality of server security certificates is out of date;
update the SIM to add a new server security certificate associated with a corresponding server;
initiating a storage of the new server security certificate on the SIM;
receive a reply that the attempt to store the new server security certificate on the SIM has failed;
cause, in response to receiving the reply, the SIM to remove the first server security certificate;
configure the SIM to use the new server security certificate of the plurality of server security certificates to communicate with the corresponding server; and
based at least in part on the one of the plurality of server security certificates, couple the electronic device with the corresponding server via the wireless communication network.

16. The non-transitory storage medium of claim 15, wherein the instructions are further executable by the one or more processors to:
cause the SIM to store the new server security certificate.

17. The non-transitory storage medium of claim 16, wherein the instructions are further executable by the one or more processors to update the SIM with the new server security certificate by:
receiving the new server security certificate from a network;
sending, via the wireless communication network, the new server security certificate to the electronic device; and
receiving a first indication regarding the updating of the SIM with the new server security certificate.

18. The non-transitory storage medium of claim 17, wherein the first indication indicates failure with respect to updating the SIM with the new server security certificate, and wherein the instructions are further executable by the one or more processors to:
re-send, via the wireless communication network, the new server security certificate to the electronic device; and
receive a second indication regarding success of updating the SIM with the new server security certificate.

19. The method of claim 1, wherein the SIM is provisioned with the plurality of server security certificates during manufacturing.

\* \* \* \* \*